(12) United States Patent
Kim

(10) Patent No.: US 10,450,146 B2
(45) Date of Patent: Oct. 22, 2019

(54) AUTOMATIC ARTICLE SORTING CONVEYOR APPARATUS

(71) Applicants: HWADONG HIGHTECH CO., LTD, Gyeonggi-do (KR); Dong Hwan Kim, Incheon (KR)

(72) Inventor: Dong Hwan Kim, Incheon (KR)

(73) Assignees: HWADONG HIGHTECH CO., LTD., Gyeonggi-do (KR); Dong Hwan Kim, Incheon (KR)

( * ) Notice: Subject to any disclaimer, the term of this patent is extended or adjusted under 35 U.S.C. 154(b) by 0 days.

(21) Appl. No.: 16/107,657

(22) Filed: Aug. 21, 2018

(65) Prior Publication Data

US 2019/0062072 A1     Feb. 28, 2019

(30) Foreign Application Priority Data

Aug. 22, 2017  (KR) .................. 10-2017-0106200

(51) Int. Cl.
  *B65G 17/24*  (2006.01)
  *B65G 43/10*  (2006.01)
  *B65G 47/69*  (2006.01)
  *B65G 47/49*  (2006.01)
  *B65G 47/68*  (2006.01)

(52) U.S. Cl.
  CPC ........... *B65G 47/49* (2013.01); *B65G 47/684* (2013.01)

(58) Field of Classification Search
  None
  See application file for complete search history.

(56) References Cited

U.S. PATENT DOCUMENTS

| | | | | |
|---|---|---|---|---|
| 2,828,852 A | * | 4/1958 | Lorig ................... | B65G 39/02 198/785 |
| 5,769,204 A | * | 6/1998 | Okada .................. | B65G 47/31 198/443 |
| 6,401,936 B1 | * | 6/2002 | Isaacs .................. | B65G 43/08 198/367.1 |
| 6,457,623 B1 | * | 10/2002 | Rey ....................... | B65H 23/26 198/785 |

(Continued)

FOREIGN PATENT DOCUMENTS

| | | |
|---|---|---|
| JP | H07-81741 A | 3/1995 |
| JP | H07-267341 A | 10/1995 |

(Continued)

*Primary Examiner* — Kavel Singh
(74) *Attorney, Agent, or Firm* — Masuvalley & Partners

(57) ABSTRACT

An automatic article sorting conveyor apparatus includes a supply unit configured to include first and second oblique roller frames having a plurality of first and second oblique rollers and to convey articles, an arranging unit configured to include third and fourth oblique roller frames having a plurality of third and fourth oblique rollers and a middle belt frame including a middle belt having a front coupled to the first and second oblique roller frames, and an article drop unit configured to include first and second counter-oblique roller frames having a plurality of first and second counter-oblique rollers on the left and right sides of the middle belt, first and second drop chutes having one ends coupled to the first and second counter-oblique roller frames, and first and second conveying belt frames have one ends coupled to the first and second drop chutes and including conveying belts circulate.

8 Claims, 12 Drawing Sheets

(56) References Cited

U.S. PATENT DOCUMENTS

| | | | |
|---|---|---|---|
| 9,085,422 B2 * | 7/2015 | Cristoforetti | B65G 17/24 |
| 9,511,953 B1 * | 12/2016 | Mueller | B65G 47/46 |
| 9,533,836 B2 * | 1/2017 | Cristoforetti | B65G 47/22 |
| 9,815,090 B2 * | 11/2017 | Wargo | B07C 7/00 |
| 2005/0072656 A1 | 4/2005 | Costanzo | |

FOREIGN PATENT DOCUMENTS

| | | |
|---|---|---|
| JP | H10-114409 A | 5/1998 |
| JP | 4287511 B2 | 7/2009 |

\* cited by examiner

AUTOMATIC ARTICLE SORTING CONVEYOR APPARATUS

CROSS REFERENCE TO RELATED APPLICATION

The present application claims the benefit of Korean Patent Application No. 10-2017-0106200 filed in the Korean Intellectual Property Office on Aug. 22, 2017, the entire contents of which are incorporated herein by reference.

BACKGROUND OF THE INVENTION

1. Technical Field

The present invention relates to a conveyor apparatus for automatically sorting and conveying articles and, more particularly, to an automatic article sorting conveyor apparatus, wherein articles of various sizes, such as boxes or packaged products input from multiple places all at the same time, can be aligned or arranged on the middle side so that a sorting task for the articles can be performed and discharged to a separator, such as a sorter in a post process, not-aligned and non-processed articles can be recirculated, distribution throughput can be increased, and an error rate can be significantly reduced.

2. Description of the Related Art

In general, an article conveying conveyor (hereinafter referred to as a "conveyor") is equipment for conveying articles automatically or continuously in a specific distance and uses a belt, trolley or roller as a conveying medium.

Furthermore, on the strength the development of the information communication technology, various types of articles are ordered through Internet shopping, home shopping and mobile shopping and are delivered to consumers through home delivery service. Home delivery service distributes a large amount of articles in a small quantity batch order pattern.

As home delivery articles of a small quantity batch order continue to increase, a conveyor for conveying articles and a sorter, that is, an apparatus for automatically sorts articles, are complexly installed on a freight warehouse and article center so that articles conveyed in quantity through the conveyor, that is, conveying and carrying equipment, are automatically sorted.

Accordingly, in the freight warehouse, article warehouse or home delivery company in which various types of articles are stored and sorted, a conveyer for conveying articles between specific sections and a separator, such as a sorter, are complexly constructed to convey and sort the articles because a worker has a limit to the sorting of various articles one by one through a manual task.

However, an apparatus for primarily sorting articles that are stored and conveyed through the conveyor and secondarily sorting the aligned articles in accordance with an increase in the amount the articles needs to be driven at a high speed. When the apparatus is driven at a high-speed operation of a set amount or more, a phenomenon in which not-sorted articles loaded onto the conveyor for the alignment of articles and conveyed are broken away to the outside due to a collision or pushing in the process of the articles being conveyed occurs.

Furthermore, if articles relatively greater than normal throughput are input when articles input to the conveyor are primarily aligned in order to facilitate a sorting task, there is a problem in that work productivity is low because the amount of stored articles loaded onto the conveyor must be controlled based on article alignment throughput.

(Patent Document 1) KR10-2017-0019238 A

SUMMARY OF THE INVENTION

Accordingly, the present invention has been made keeping in mind the above problems occurring in the prior art, and an object of the present invention is to provide an automatic article sorting conveyor apparatus, wherein articles of various sizes, such as boxes or packaged products input from multiple places all at the same time, can be smoothly guided into a separator, such as a sorter in a post process, while sorting the articles on the middle side so that a sorting task for the articles can be performed, non-processed articles that have not been aligned on the middle side can be recirculated, thereby being capable of stably performing a logistic alignment and separation task regardless of the amount of articles stored.

Technical objects to be achieved by the present invention are not limited to the aforementioned technical objects, and other technical objects not described above may be evidently understood by a person having ordinary skill in the art to which the present invention pertains from the following description.

At least one embodiment of the present invention provides an automatic article sorting conveyor apparatus, including (1) a supply unit configured to include first and second oblique roller frames having a plurality of first and second oblique rollers rotatably driven by first and second motors and to convey articles so that the articles are collected between the first and second oblique roller frames, (2) an arranging unit configured to include third and fourth oblique roller frames having a plurality of third and fourth oblique rollers rotatably driven by third and fourth motors and a middle belt frame including a middle belt having a front coupled to the first and second oblique roller frames, positioned between the third and fourth oblique roller frames and circulated and rotated by a rotational drive, and to arrange and convey articles loaded onto the front end side of the middle belt and articles loaded onto both sides of the middle belt in a row, and (3) an article drop unit configured to include first and second counter-oblique roller frames having a plurality of first and second counter-oblique rollers rotatably driven by fifth and sixth motors on the left and right sides of the middle belt, first and second drop chutes having one ends coupled to the first and second counter-oblique roller frames and disposed on both sides of the middle belt frame, and first and second conveying belt frames have one ends coupled to the first and second drop chutes and including conveying belts circulated and rotated by a rotational drive, and to reversely convey articles that are moved to both sides of the middle belt and dropped to the first and second drop chutes, wherein the dropped articles are resupplied towards the supply unit.

Any one of the first to sixth motors rotatably driving the first and second oblique rollers, the third and fourth oblique rollers and the first and second counter-oblique rollers may include a driving pulley assembled with a driving shaft, a driven pulley coupled to the driving pulley through the medium of a belt member, a support bracket with which one end of a support shaft assembled with the driven pulley is assembled in such a way as to be replaceable, and a driving contact roller integrally assembled with the support shaft through the medium of the driven pulley and a coupling member to circumscribe any one of the plurality of rollers through the medium of a belt member for contact.

The support bracket may be installed on a horizontal stand fixed to any one of the first to fourth oblique roller frames, the first and second oblique roller frames and coupled through the medium of a bolt member for elevation adjustment having a nut member for fixing.

First and second inclined plates may be inclined at a specific angle and externally disposed between the first and second counter-oblique roller frames and the first and second conveying belt frames.

The first, second conveying belt frame may include a horizontal belt frame having a horizontal conveying belt having one end coupled to the discharge ends of the first and second drop chutes positioned at a location relatively lower than the middle belt and circulated and rotated by the rotational drive of a seventh motor and an oblique belt frame having an inclined conveying belt coupled to one end of the horizontal belt frame and circulated by the rotational drive of an eighth motor to convey dropped articles up to the elevation corresponding to the middle belt.

The middle belt is provided in a middle belt frame between the third and fourth oblique roller frames, between the first and second counter-oblique roller frames and between the first and second drop chutes in such a way as to be circulated and rotated. The middle belt frame includes a pair of support plates having bottoms fixed to the third and fourth oblique roller frames, the first and second counter-oblique roller frames, and the first and second drop chutes. Both ends of a plurality of rollers for belt circulation on which the middle belt is wound are rotatably supported to the pair of support plates.

The conveyer belt may further include a redirection unit configured to redirect the articles dropped and reversely conveyed by the article drop unit toward the supply unit side. The redirection unit may include first and second redirection frames having oblique sides at one end coupled to the first and second conveying belt frames and oblique sides at the other end coupled to the first and second oblique roller frames of the supply unit and circulated and rotated by a rotational drive.

The redirection unit may include a vertical frame vertically positioned in the long side part of the first and second redirection frames at a predetermined elevation to prevent the falling of articles redirected toward the supply unit side by the circular rotation of the first and second redirection belts and a plurality of vertical rollers having the top and bottom assembled with the vertical frame so as to be freely rotatable.

DESCRIPTION OF REFERENCE NUMERALS OF PRINCIPAL ELEMENTS IN THE DRAWINGS

Figure 1:
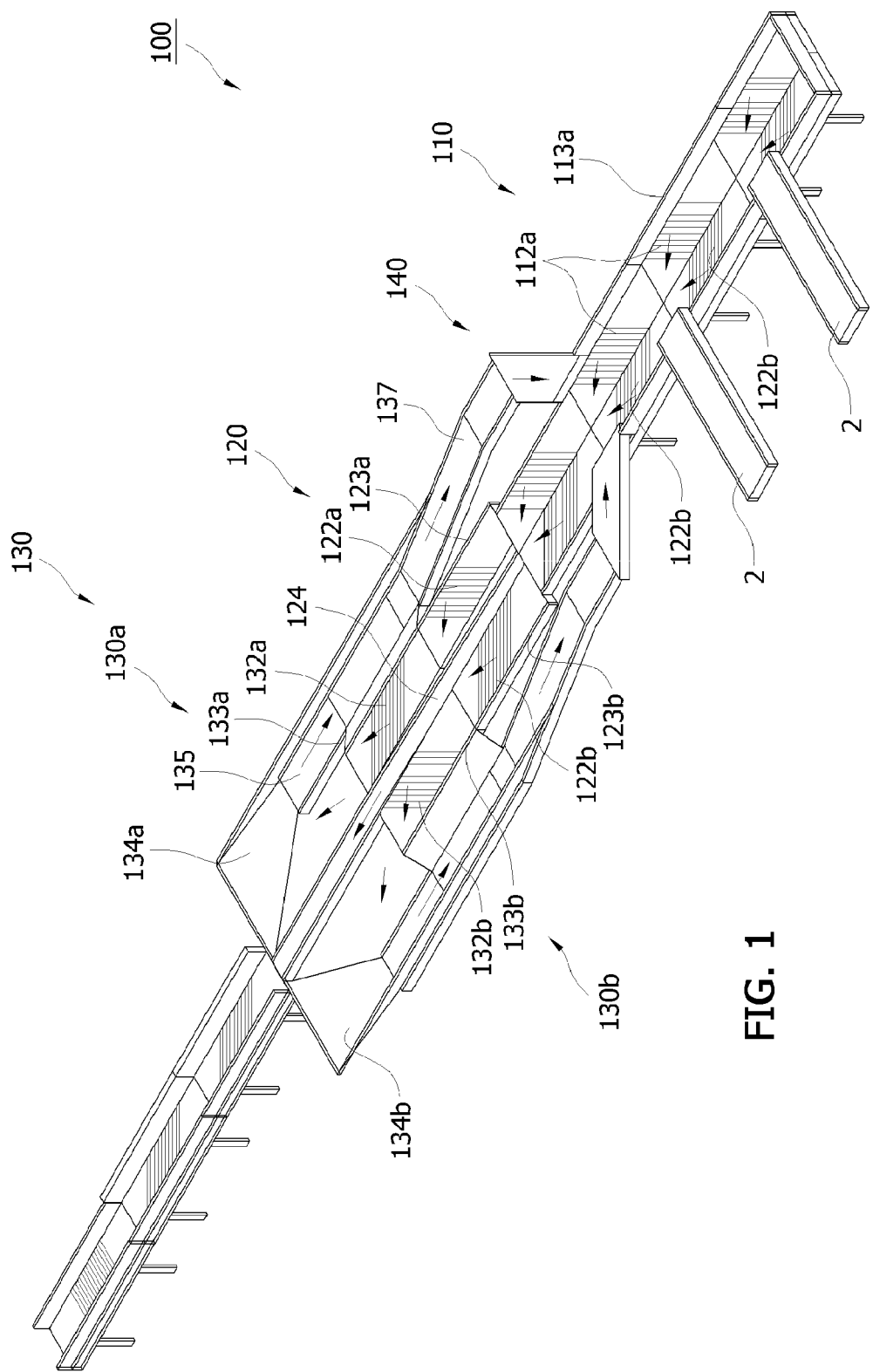
FIG. 1 is an overall schematic diagram showing an automatic article sorting conveyor apparatus according to at least one embodiment of the present invention.

110: supply unit
111a, 111b: first and second motors
112a, 112b: first and second counter-oblique rollers
113a, 113b: first and second oblique roller frames
120: arranging unit
121a, 121b: third and fourth motors
122a, 122b: third and fourth oblique rollers
123a, 123b: third and fourth oblique roller frames
124: middle belt
125: rollers for belt circulation
125a, 125b: support plates
130: article drop unit
130a, 130b: first and second conveying belt frames
131a, 131b: fifth and sixth motors
132a, 132b: first and second counter-oblique rollers
133a, 133b: first and second counter-oblique roller frames
134a, 134b: first and second drop chutes
134c, 134d: inclined plate
135: horizontal conveying belt
136: seventh motor
137: inclined conveying belt
138: eighth motor
140: redirection unit
142a, 142b: first and second redirection belts
143a, 143b: first and second redirection frames

DETAILED DESCRIPTION

Hereinafter, embodiments of the present invention are described in detail with reference to the accompanying drawings so that a person having ordinary skill in the art to which the present invention pertains may easily practice the present invention. In describing the structure principle of at least one embodiment of the present invention in detail, a detailed description of a related known function or construction will be omitted if it is deemed to make the gist of the present invention unnecessarily vague.

Furthermore, the same reference numerals are used in parts having similar functions and operations throughout the drawings.

In addition, in the specification, when it is said that one part is "coupled" or "coupled" to the other part, it should be understood that one part may be "directly coupled or coupled" to the other part and the two parts may be "indirectly coupled or coupled" with a third part interposed therebetween. Furthermore, when it is said that one element "includes" the other element, the word "include" does not exclude another element unless explicitly described to the contrary and may further include another element.

As shown in FIG. 1, a conveyer belt 100 for automatic article alignment and conveying according to at least one embodiment of the present invention may include a supply unit 110, an arranging unit 120, an article drop unit 130 and a redirection unit 140 so that articles, that is, objects to be aligned and sorted, are aligned on the middle side and conveyed in a row while they are conveyed in one direction and not-aligned articles are circulated and conveyed.

As shown in FIGS. 1, 2, 3 and 4, the supply unit 110 may include a first oblique roller frame 113a in which multiple first oblique rollers 112a rotatably driven in one direction by a first motor 111a that generates a rotational drive when electric power is applied are inclined at a predetermined angle, and a second oblique roller frame 113b in which multiple second oblique rollers 112b rotatably driven in one direction by a second motor 111b are inclined at a predetermined angle.

The first and second oblique rollers 112a and 112b, each one having both ends rotatably supported by the first and second oblique roller frames 113a and 113b, respectively, have a symmetrical structure with respect to the middle between the first and second oblique roller frames disposed adjacent to each other in parallel. Accordingly, the first and second oblique rollers 112a and 112b are inclined at a specific angle so that articles loaded onto the first and second oblique rollers of the first and second oblique roller frames and conveyed toward the arranging unit 120 in one direction are collected toward the middle side between the first and second oblique roller frames and moved.

In this case, the outside end of each of the first and second oblique rollers 112a and 112b is inclined at a specific angle θ1 toward the arranging unit 120 with respect to a first virtual line P1 orthogonal to a virtual middle line P between the first and second oblique roller frames.

The first and second oblique roller frames 113a and 113b are loaded onto a vertical stand 118 and supported so that they are spaced apart from a bottom surface at a predetermined elevation. An elevation adjustment member 118a, such as a bolt member of a specific length screwed onto the vertical stand, for adjusting the high and low of the first and second oblique roller frames may be provided at the lower part of the vertical stand.

Accordingly, articles loaded onto the first and second oblique rollers disposed in the first and second oblique roller frames in the symmetrical structure by the rotation of the first and second oblique roller frames are gradually collected toward the middle area between the first oblique roller frame and the second oblique roller frame disposed in parallel and are conveyed in one direction.

Figure 4:
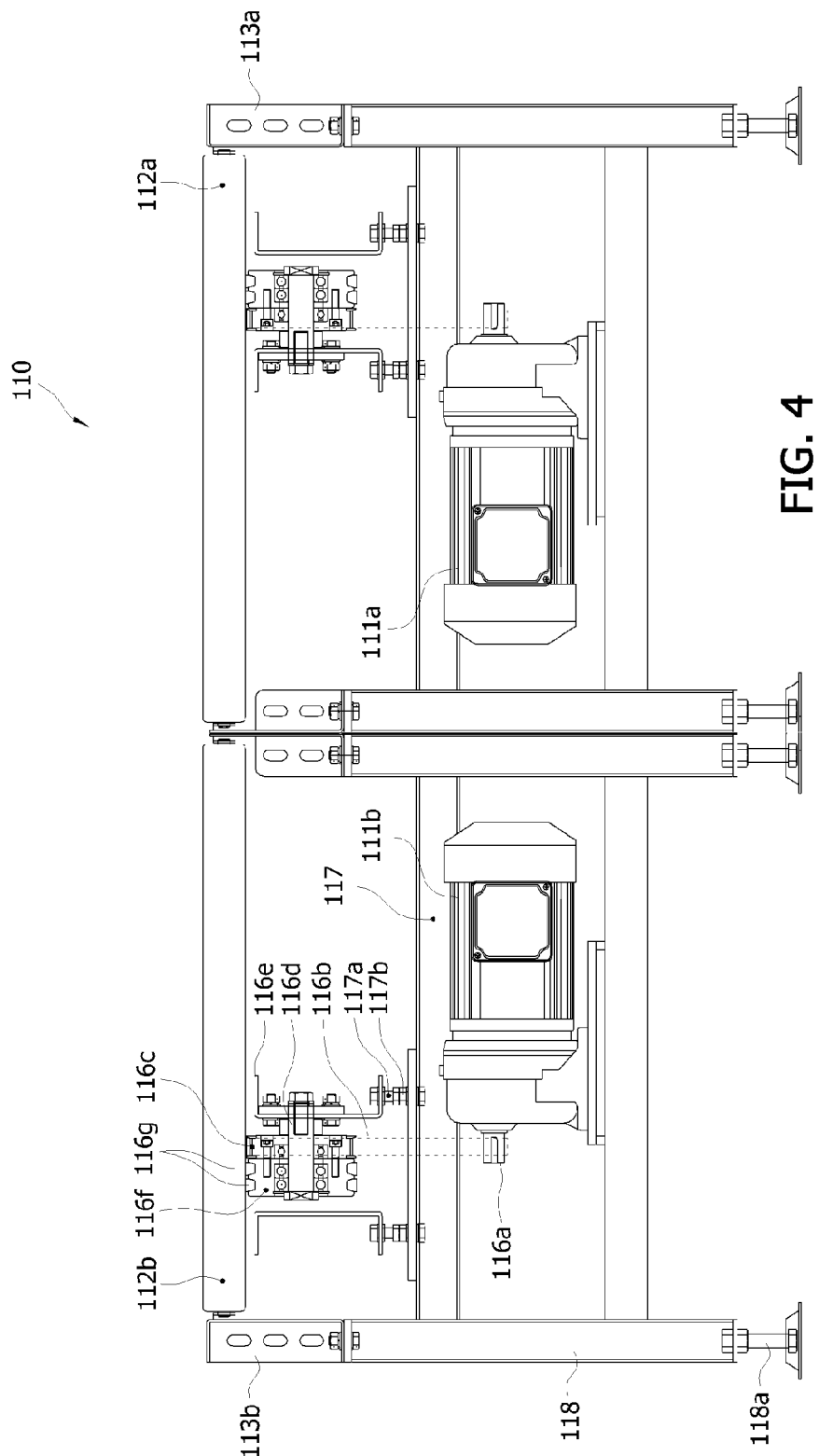
FIG. 4 is a cross-sectional view showing the supply unit of the automatic article sorting conveyor apparatus according to at least one embodiment of the present invention.
Figure 5A:
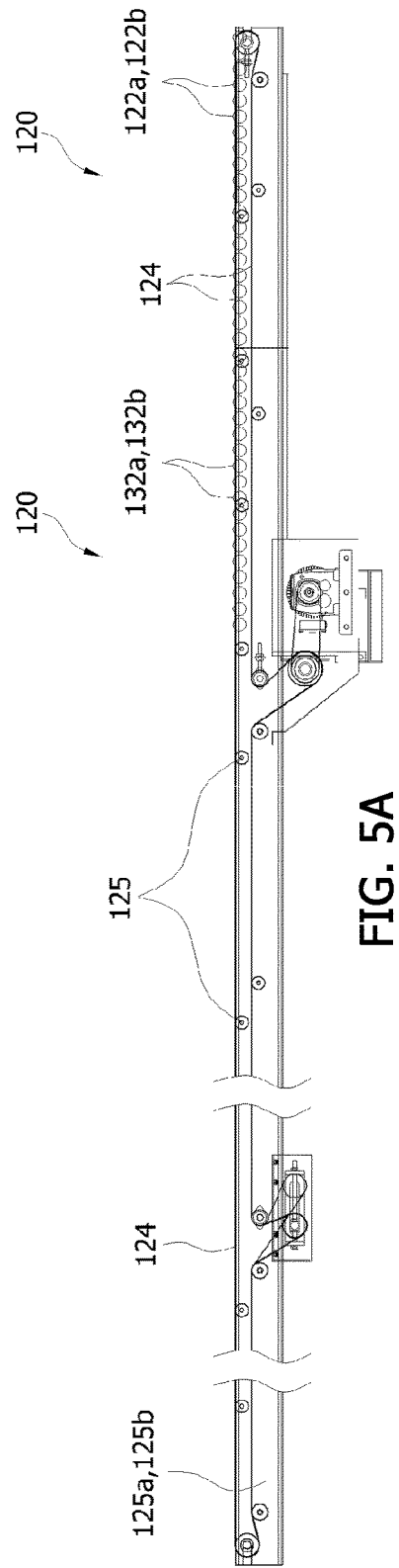
FIG. 5A is a plan view showing the supply unit of the automatic article sorting conveyor apparatus according to at least one embodiment of the present invention.
Figure 5B:
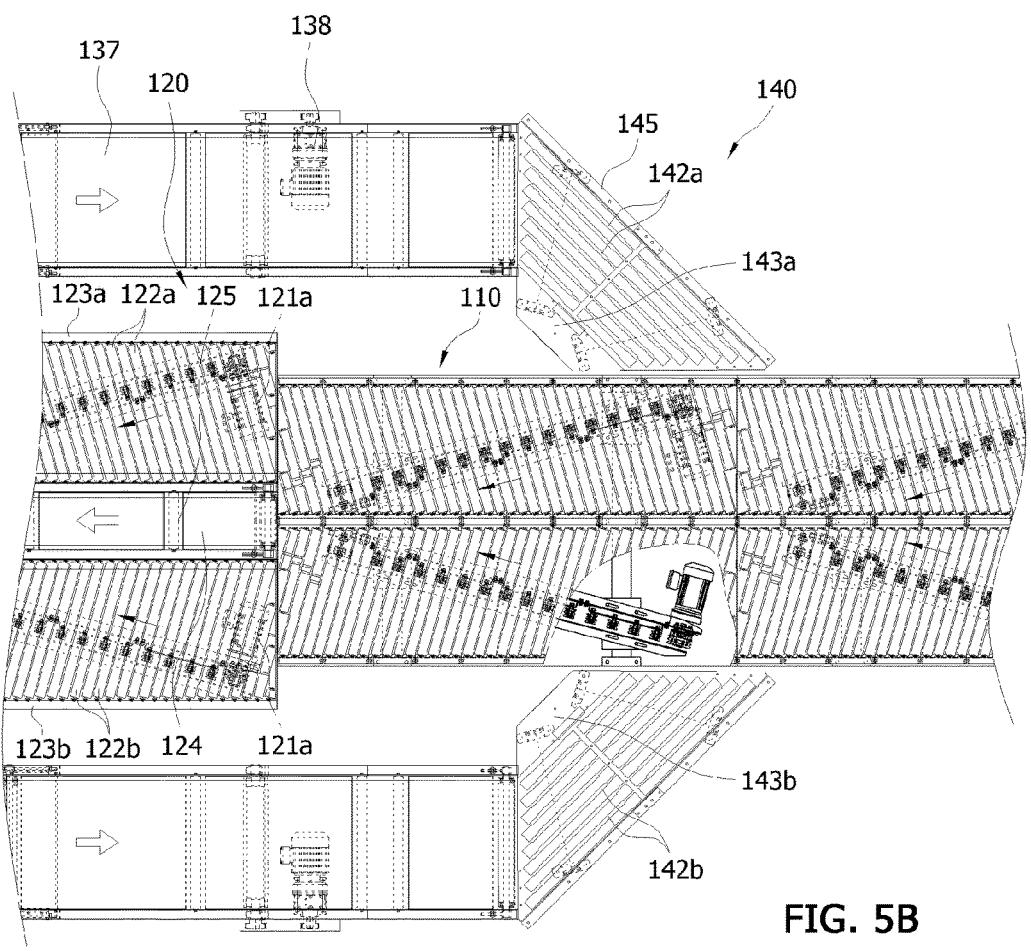
FIG. 5B is a side view showing the supply unit of the automatic article sorting conveyor apparatus according to at least one embodiment of the present invention.

In this case, as shown in FIG. 4, the first, second motors 111a, 111b that rotatably drives the first, second oblique rollers 112a, 112b includes a driving pulley 116a assembled into a driving shaft and a driven pulley 116c coupled through the medium of a belt member 116b, such as a timing belt. The first, second motor includes a support bracket 116e with which one end of a support shaft 116d assembled with the driven pulley is assembled in such a way as to be replaceable and a driving contact roller 116f integrally assembled with the support shaft through the medium of the driven pulley 116c and a coupling member to circumscribe any one of the plurality of first and second oblique rollers through the medium of a belt member 116g for contact.

In this case, the support bracket 116a is provided as a support frame of an approximately C-sectional shape that is diagonally fixed in the first and second oblique roller frames so that the support bracket is orthogonal to the first and second oblique rollers inclined and provided in the first and second oblique roller frames approximately in an orthogonal direction. The belt member for contact has one end wound on the driving contact roller and the other end wound on the driven contact roller positioned at one end of the support bracket. A plurality of idle contact rollers disposed to correspond to the plurality of first and second oblique rollers, respectively, may be disposed in the support bracket between the driving contact roller and the driven contact roller.

Accordingly, when the driving and driven pulleys are rotatably driven in one direction by the rotation of the first and second motors, the plurality of idle contact rollers provided between the driving contact roller and the driven contact roller is rotated in one direction because the driven pulley and the driving contact roller provided in the support shaft are rotatably driven in one direction, thereby simultaneously rotatably driving the plurality of first and second oblique rollers that circumscribe any one of the plurality of first and second oblique rollers through the medium of the belt member for contact. Accordingly, articles loaded onto the first and second oblique rollers are collected and conveyed on the middle side between the first and second oblique roller frames.

Furthermore, the support bracket 116a is positioned in a horizontal stand 117 horizontally fixed to the first and second oblique roller frames and is coupled thereto through the medium of a bolt member 117a for elevation adjustment having a nut member 117b for fixing, thereby being capable of adjusting the high and low of the support bracket by a rotational manipulation of the bolt member for elevation adjustment. Accordingly, contact pressure between the first and second oblique rollers and the driving, driven and idle contact rollers can be controlled.

Furthermore, in the supply unit 110, every four sets, each one including a pair of the left and right first and second oblique roller frames respectively having the first and second oblique rollers inclined at a specific angle, has been illustrated as being continuously disposed toward the article conveying direction, but the present invention is not limited thereto. At least two sets may be disposed. The supply unit 110 may include a transfer conveyor 2 for input on one side of the pair of left and right first and second oblique roller frames so that articles, that is, objects to be aligned and sorted, are randomly input and loaded onto the first and second oblique rollers.

As shown in FIGS. 1, 2 and 5a to 6, like the supply unit 110, the arranging unit 120 may include a third oblique roller frame 123a in which multiple third oblique rollers 122a rotatably driven in one direction by a third motor 121a that generates a rotational drive when electric power is applied are inclined at a specific angle, a fourth oblique roller frame 123b in which multiple fourth oblique rollers 122b rotatably driven in one direction by a fourth motor 121b are included at a specific angle, a middle belt frame having a front end coupled to a middle portion where the first and second oblique roller frames of the supply unit are coupled and positioned between the third and fourth oblique roller frames 123a and 123b, and a middle belt 124 of a specific length circulated and rotated to convey articles by a motor driving source in the middle belt frame.

The third and fourth oblique rollers 122a and 122b, each one having both ends rotatably supported by the third and fourth oblique roller frames 123a and 123b, respectively, have a symmetrical structure with respect to a middle belt 124 positioned between the third and fourth oblique roller frames disposed in parallel at specific intervals. Accordingly, the third and fourth oblique rollers are inclined at a specific angle to have the same gradient as the first and second oblique rollers so that articles loaded onto the third and fourth oblique rollers of the third and fourth oblique roller frames and conveyed in one direction are loaded from both sides of the middle belt and conveyed.

Like the first and second oblique roller frames, the third and fourth oblique roller frames 123a and 123b are loaded onto the vertical stand 118 and supported. The elevation adjustment member 118a may be provided at the lower part of the vertical stand to adjust the high and low of the vertical stand.

Accordingly, articles loaded from both sides of the middle belt by the third and fourth oblique rollers of the third and fourth oblique roller frames, along with articles loaded from the front end side of the middle belt by the first and second oblique rollers of the first and second oblique roller frames, are guided and conveyed to a post process while arranging the middle belt approximately in a row.

Furthermore, a separator, such as a sorter, is positioned on the exit side of the middle belt so that articles guided and conveyed while they are aligned in a row can be sorted, so a sorting process can be consecutively performed.

Figure 6:
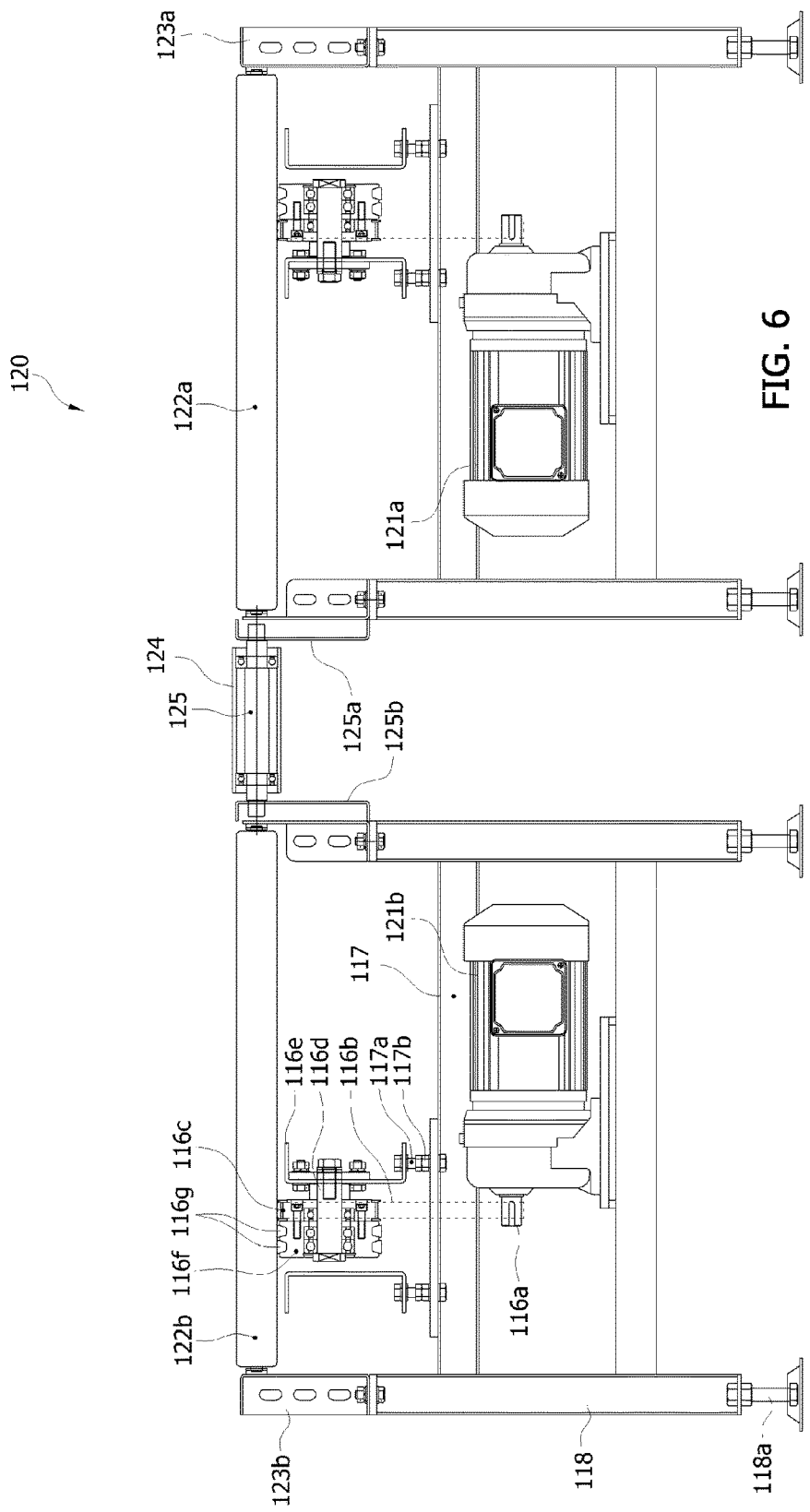
FIG. 6 is a cross-sectional view showing the arranging unit of the automatic article sorting conveyor apparatus according to at least one embodiment of the present invention.
Figure 7A:
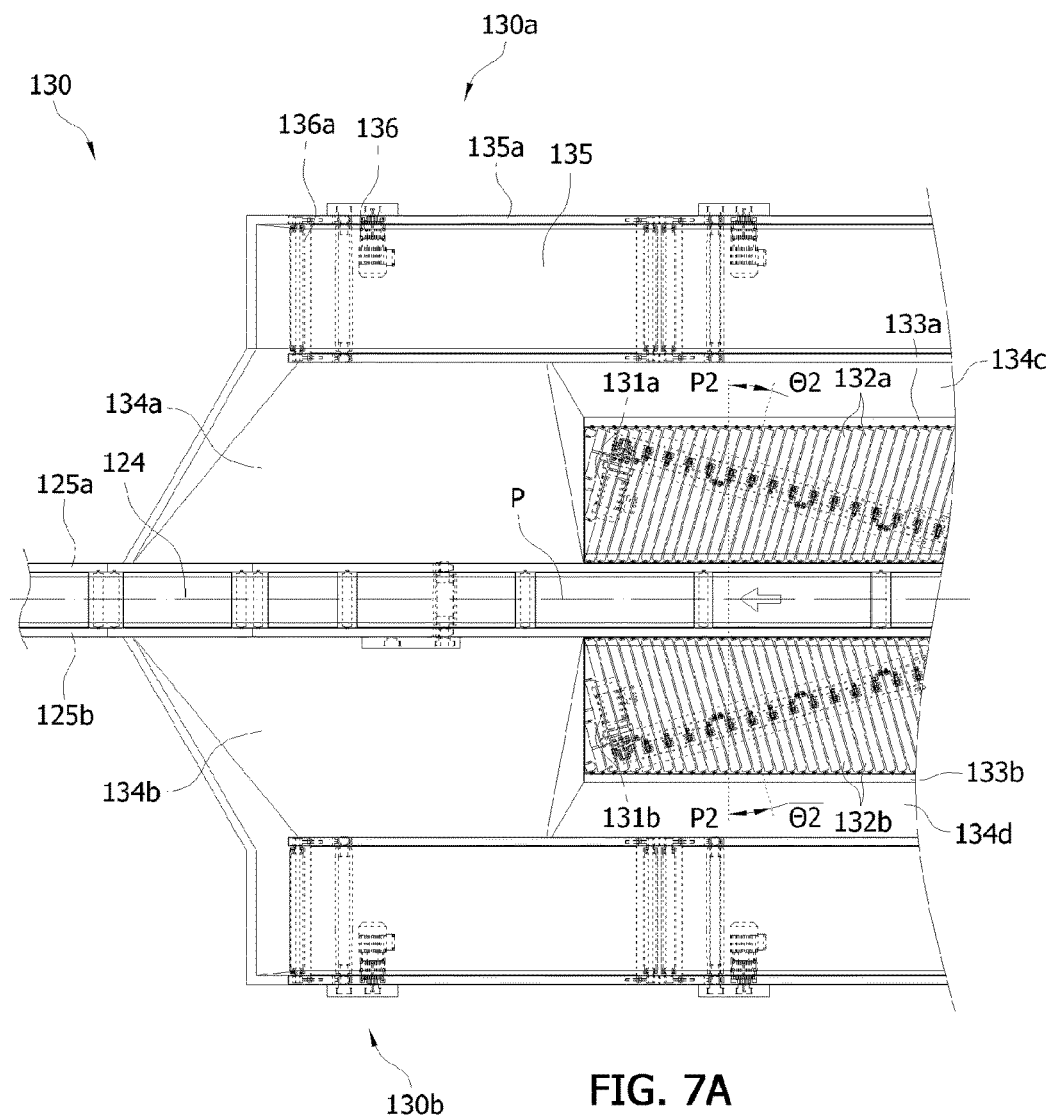
FIG. 7A is a plan view showing the article drop unit of the automatic article sorting conveyor apparatus according to at least one embodiment of the present invention.
Figure 7B:
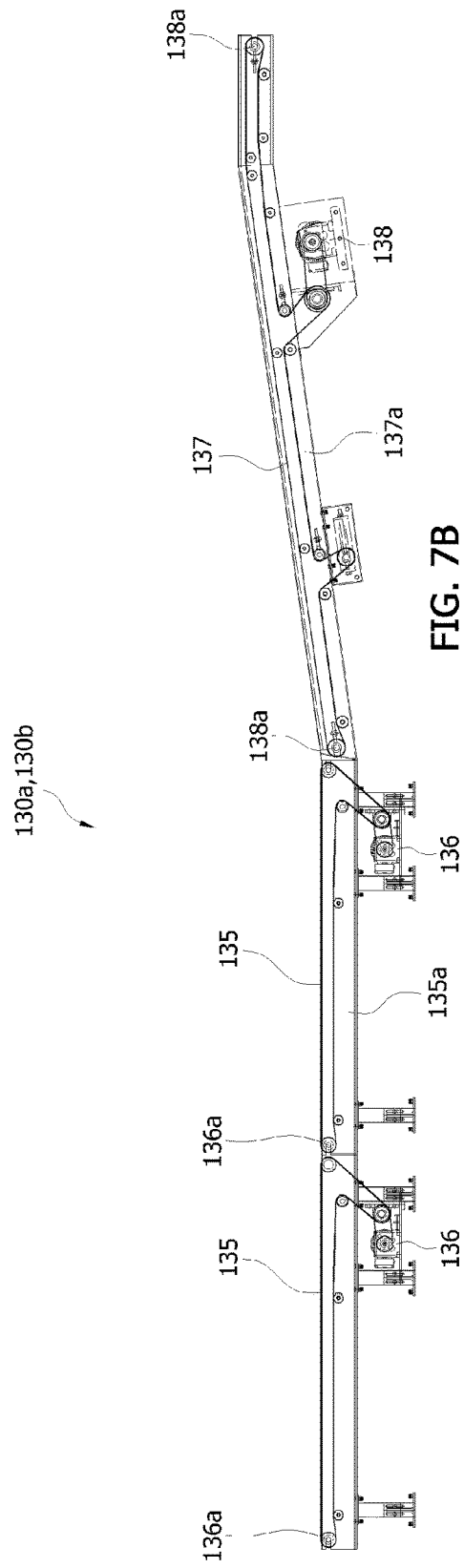
FIG. 7B is a side view showing the middle belt and middle belt frame of the automatic article sorting conveyor apparatus according to at least one embodiment of the present invention.

In this case, as shown in FIG. 6, like the first and second motors, each of the third and fourth motors 121a and 121b that rotatably drive the third and fourth oblique rollers 122a and 122b includes the driving pulley 116a assembled with the driving shaft, the driven pulley 116c coupled through the medium of the belt member 116b, the support bracket 116e with which one end of the support shaft 116d assembled with the driven pulley is assembled in such a way as to be replaceable, and the driving contact roller 116f assembled with the support shaft through the medium of the driven pulley 116c and a coupling member to circumscribe any one of the plurality of third and fourth oblique rollers through the medium of the belt member 116g for contact.

In this case, the support bracket 116a is provided as a support frame of an approximately C-sectional shape that is diagonally fixed in the third and fourth oblique roller frames so that the support bracket is orthogonal to the third and fourth oblique rollers provided in the third and fourth oblique roller frames approximately in an orthogonal direction. The belt member for contact has one end wound on the driving contact roller and the other end wound on the driven contact roller positioned at one end of the support bracket. A plurality of idle contact rollers disposed to correspond to the plurality of third and fourth oblique rollers, respectively, may be disposed between the driving contact roller and the driven contact roller.

Accordingly, when the driving and driven pulleys are rotatably driven in one direction by the rotation of the third and fourth motors, the plurality of idle contact rollers provided between the driving contact roller and the driven contact roller is rotated in one direction because the driven pulley and the driving contact roller provided in the support shaft are rotatably driven in one direction, thereby rotatably driving the plurality of third and fourth oblique rollers that circumscribe any one of the plurality of third and fourth oblique rollers through the medium of the belt member for contact. Accordingly, articles loaded onto the third and fourth oblique rollers, along with articles loaded from the front end of the middle belt, can be loaded onto the middle belt positioned between the third and fourth oblique roller frames, can be aligned in a row and can be conveyed so that a separation and sorting task in a post process is possible.

In this case, the middle belt 124 comes into contact with rollers 125 for belt circulation disposed between the third oblique roller frame and the fourth oblique roller frame, and circulates to convey articles. Both ends of the rollers 125 for belt circulation may be rotatably assembled with the middle belt frame including a pair of left and right support plates 125a and 125b fixed to the third and fourth oblique roller frames, respectively.

Furthermore, a separator, such as a sorter, may be complexly constructed on the exit side of the middle belt 124 so that various types of articles aligned in a row and conveyed can be sorted and selected for each type.

As shown in FIGS. 1, 2 and 7a to 8, the article drop unit 130 includes a first counter-oblique roller frame 133a in which a plurality of first counter-oblique rollers 132a rotatably driven by a fifth motor 131a is inclined at a specific angle so that the first counter-oblique rollers have a structure symmetrical to the adjacent third oblique roller 122a and a second counter-oblique roller frame 133b in which a plurality of second counter-oblique rollers 132b rotatably drives by a sixth motor 131b is inclined at a specific angle so that the second counter-oblique rollers have a structure symmetrical to the adjacent fourth oblique roller 122b on the left and right sides of the middle belt frame having the middle belt 124 that infinitely circulates in one direction. The first and second counter-oblique roller frames 133a and 133b are positioned on the both sides of the middle belt like the third and fourth oblique roller frames.

The first and second counter-oblique rollers 132a and 132b rotatably supported on both ends of the first and second counter-oblique roller frames 133a and 133b, respectively, are provided at an angle opposite the angle of the first to fourth oblique rollers of the first to fourth oblique roller frames so that articles not loaded onto the middle belt 124 can be conveyed in the direction widened toward the left and right sides of the middle belt.

The outside end of each of the first and second counter-oblique rollers 132a and 132b is inclined toward the supply unit side at a specific angle θ2 with respect to a second virtual line P2 orthogonal to the virtual middle line P that passes through the middle of the middle belt.

Like the first to third oblique roller frames, the first and second counter-oblique roller frames 133a and 133b are loaded onto the vertical stand 118 and supported. The elevation adjustment member 118a, such as a bolt member of a specific length, may be provided at the lower part of the vertical stand.

Furthermore, the first and second counter-oblique rollers and the third and fourth oblique rollers are provided as a left and right symmetrical structure with respect to a vertical virtual line (in the drawings) that connects the first and second counter-oblique roller frames 133a and 133b and the third and fourth oblique roller frames 123a and 123b.

First and second drop chutes 134a and 134b have one ends coupled to the discharge ends of the first and second counter-oblique roller frames 133a and 133b, respectively, so that articles discharged and conveyed to both sides of the middle belt can be dropped and processed by the first and second counter-oblique rollers. First and second conveying belt frames 130a and 130b include conveying belts coupled to the first and second drop chutes 134a and 134b disposed on both sides of the middle belt frame and circulated and rotated by a rotational drive so that dropped articles are reversely conveyed to the supply unit side.

The first and second conveying belt frames 130a and 130b are disposed at a specific interval in parallel to the middle belt 124 on the left and right sides of the middle belt 124, so that the dropped, but not-aligned articles are reversely conveyed to the supply unit 110 by the circulated and rotated conveying belt and circulated and supplied.

First and second inclined plates 134c and 134d inclined toward the outside at a specific angle are provided between the first and second counter-oblique roller frames 133a and 133b and the first and second conveying belt frames 130a and 130b so that articles conveyed to be widened toward both sides of the middle belt 124 by the first and second counter-oblique rollers are safely discharged on a conveying belt including a horizontal conveying belt 135 and an inclined conveying belt 137.

Furthermore, the first and second conveying belt frames 130a and 130b may include a horizontal belt frame 135a including the horizontal conveying belt 135 having one end coupled to the discharge ends of the first and second drop chutes 134a and 134b positioned at a location relatively lower than the middle belt 124 and circulated and rotated by the rotational drive of a seventh motor 136 and an inclined belt frame 137a including the inclined conveying belt 137 coupled to one end of the horizontal belt frame and circulated by the rotational drive of the eighth motor 138 to convey dropped articles up to the elevation corresponding to the middle belt 124.

Accordingly, not-aligned articles conveyed to be widened toward both sides by the first and second counter-oblique rollers 132a and 132b without being loaded onto the middle belt 124 fall toward the horizontal conveying belt 135 through the first and second drop chutes 134a and 134b. Articles loaded onto the horizontal conveying belt are inclined and conveyed up to the elevation of the middle belt 124 so that they are resupplied towards the supply unit by the redirection unit 140 while they are conveyed toward the inclined conveying belt 137.

Figure 8:
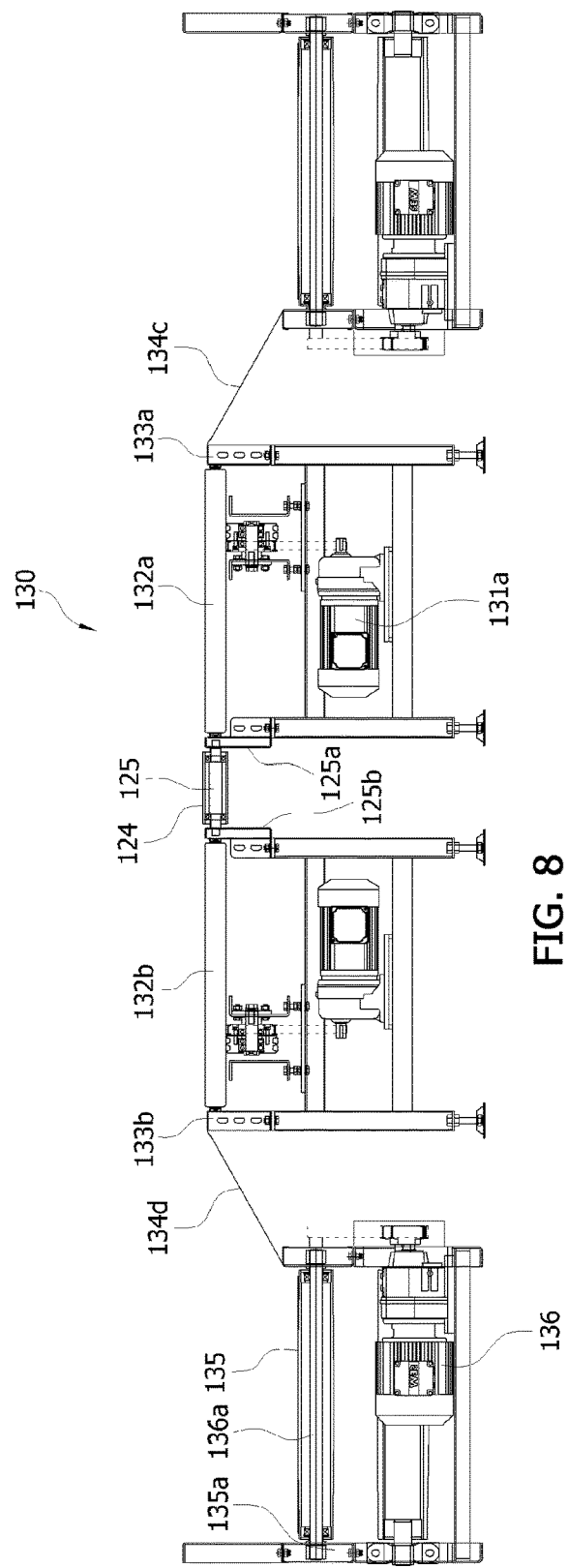
FIG. 8 is a cross-sectional view showing the article drop unit of the automatic article sorting conveyor apparatus according to at least one embodiment of the present invention.

As shown in FIG. 8, like the first to fourth motors, the fifth and sixth motors 131a and 131b to rotatably drive the first and second counter-oblique rollers 132a and 132b includes the driving pulley 116a assembled with the driving shaft, the driven pulley 116c coupled through the medium of the belt member 116b, such as a timing belt, the support bracket 116e with which one end of the support shaft 116d assembled with the driven pulley is assembled in such a way as to be replaceable, and the driving contact roller 116f integrally assembled with the support shaft through the medium of a coupling member to circumscribe any one of the plurality of counter-oblique rollers through the medium of the belt member 116g for contact.

In this case, the support bracket 116a is provided as a support frame of an approximately C-sectional shape that is diagonally fixed in the first and second oblique roller frames so that the support bracket is orthogonal to the first and second oblique rollers inclined and provided in the first and second oblique roller frames approximately in an orthogonal direction. The belt member for contact has one end wound on the driving contact roller and the other end wound on the driven contact roller positioned at one end of the support bracket. A plurality of idle contact rollers disposed to correspond to the plurality of first and second oblique rollers, respectively, may be disposed in the support bracket between the driving contact roller and the driven contact roller.

Accordingly, when the driving and driven pulleys are rotatably driven in one direction by the rotation of the first and second motors, the plurality of idle contact rollers provided between the driving contact roller and the driven contact roller is rotated in one direction because the driven pulley and the driving contact roller provided in the support shaft are rotatably driven in one direction, thereby simultaneously rotatably driving the plurality of first and second counter-oblique rollers that circumscribe any one of the plurality of first and second oblique rollers through the medium of the belt member for contact. Accordingly, articles loaded onto the first and second counter-oblique rollers are diagonally conveyed to become distant toward both sides of the middle belt and fall toward the first and second drop chutes.

Furthermore, the support bracket 116a is installed on the horizontal stand 117 fixed to the first and second counter-oblique roller frames and is coupled thereto through the medium of the bolt member 117a for elevation adjustment having the nut member 117b for fixing. Accordingly, contact pressure between the first and second counter-oblique rollers and the driving, driven and idle contact rollers can be adjusted because the high and low of the support bracket can be adjusted by a rotational manipulation of the bolt member for elevation adjustment.

Furthermore, the middle belt 124 is provided in the middle belt frame between the third and fourth oblique roller frames, between the first and second oblique roller frames and between the first and second drop chutes in such a way as to be circulated and rotated. The middle belt frame includes a pair of support plates 125a and 125b having bottoms fixed to the third and fourth oblique roller frames, the first and second counter-oblique roller frames, and the first and second drop chutes. Both ends of a plurality of rollers 125 for belt circulation on which the middle belt is wound are rotatably supported to the pair of support plates 125a and 125b.

In this case, the middle belt is circulated and rotated with respect to the rollers for belt circulation having both ends assembled with the pair of left and right support plates 125a and 125b. Accordingly, a repair and fixing task can be conveniently performed by the disassembly and reassembly task of the support plates, and the middle belt can be replaced by adjusting the interval between the pair of left and right support plates based on a change in the width of the middle belt.

Furthermore, the driving pulley that circumscribes the middle belt is provided in the driving shaft rotatably driven when power is applied in the middle of the length of the middle belt 124. Accordingly, the middle belt on which article are loaded are circulated and rotated by the rotational driving of the first and second oblique rollers and the third and fourth oblique rollers, so the articles loaded onto the middle belt and aligned can be conveyed to a post process.

Figure 2:
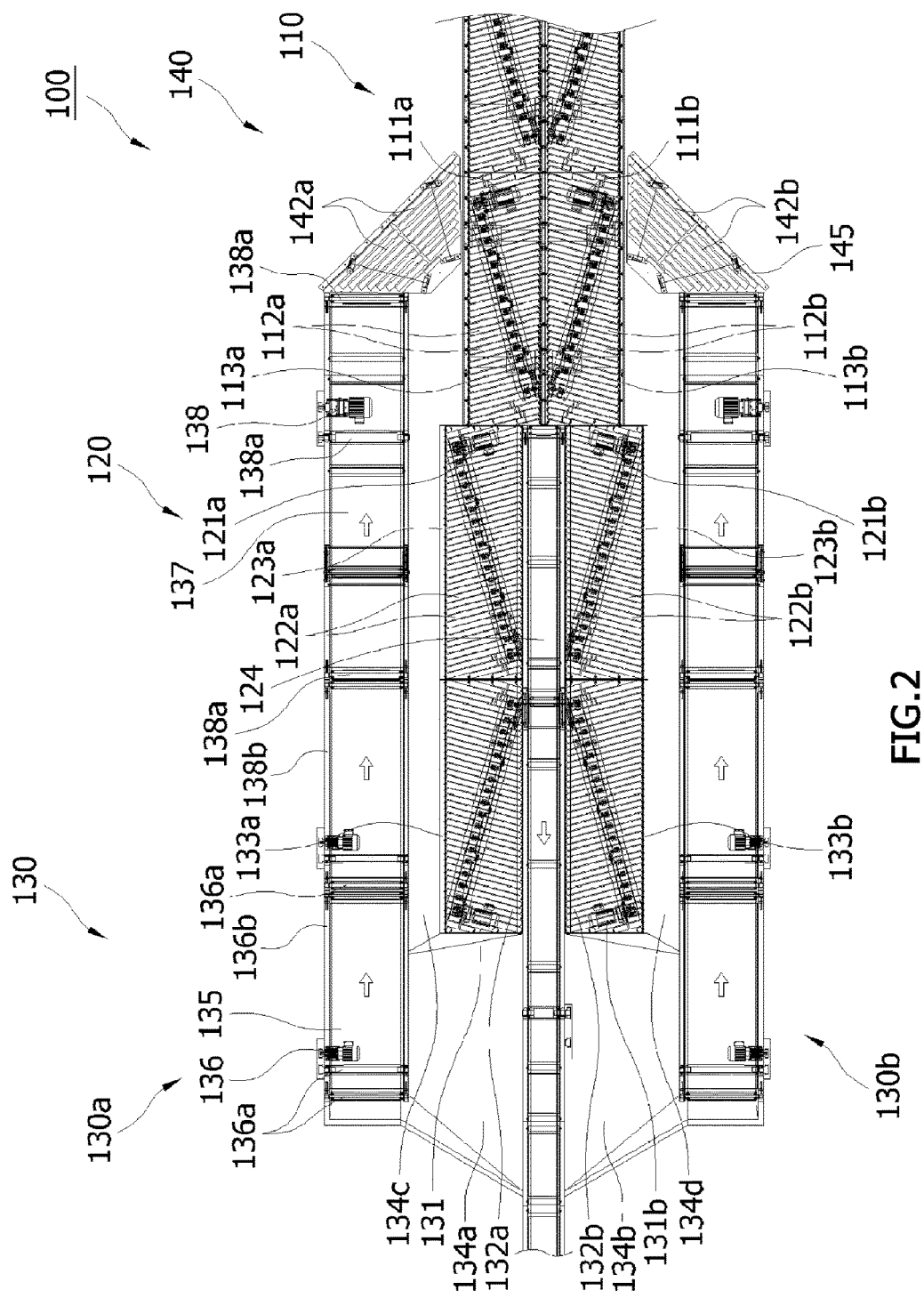
FIG. 2 is a plan view showing the automatic article sorting conveyor apparatus according to at least one embodiment of the present invention.
Figure 3A:
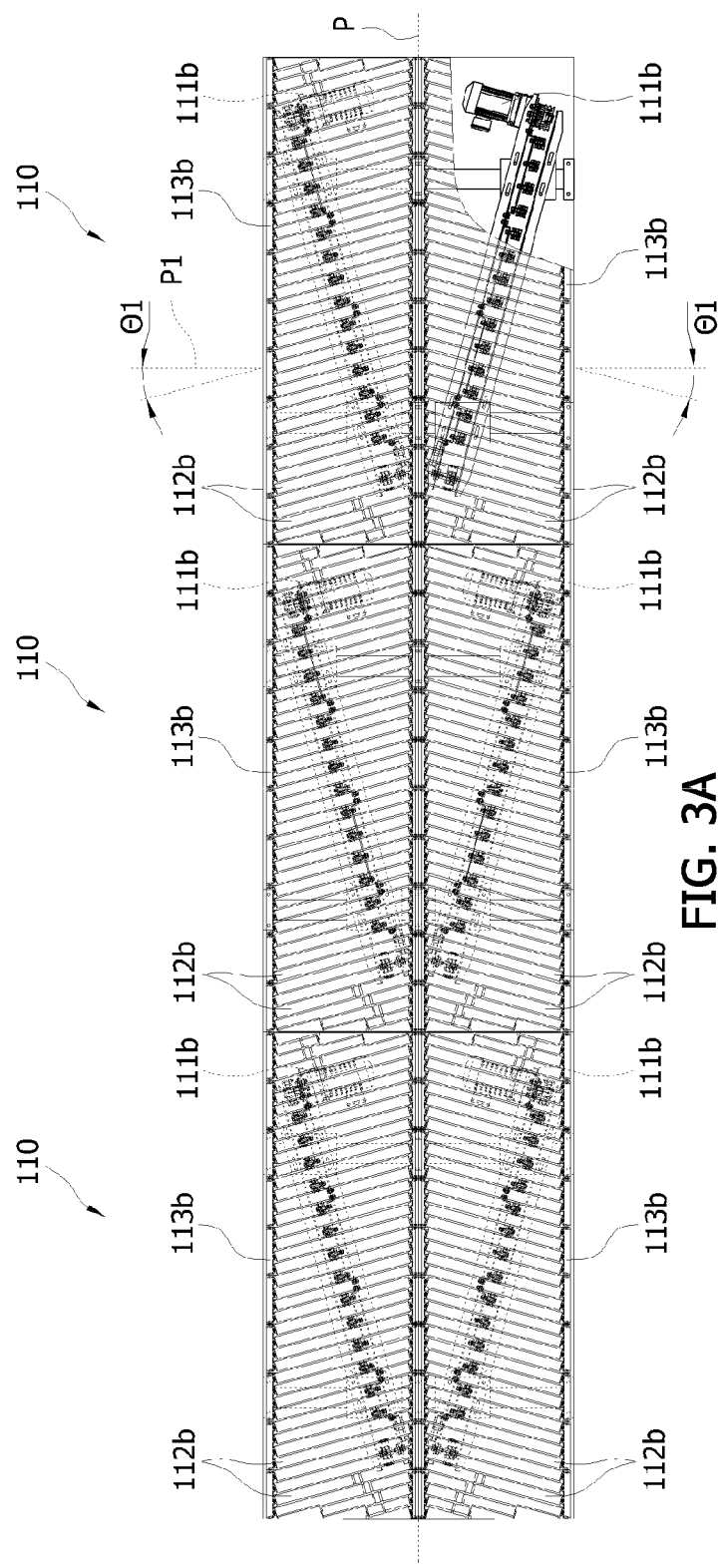
FIG. 3A is a plan view showing the supply unit of the automatic article sorting conveyor apparatus according to at least one embodiment of the present invention.
Figure 3B:
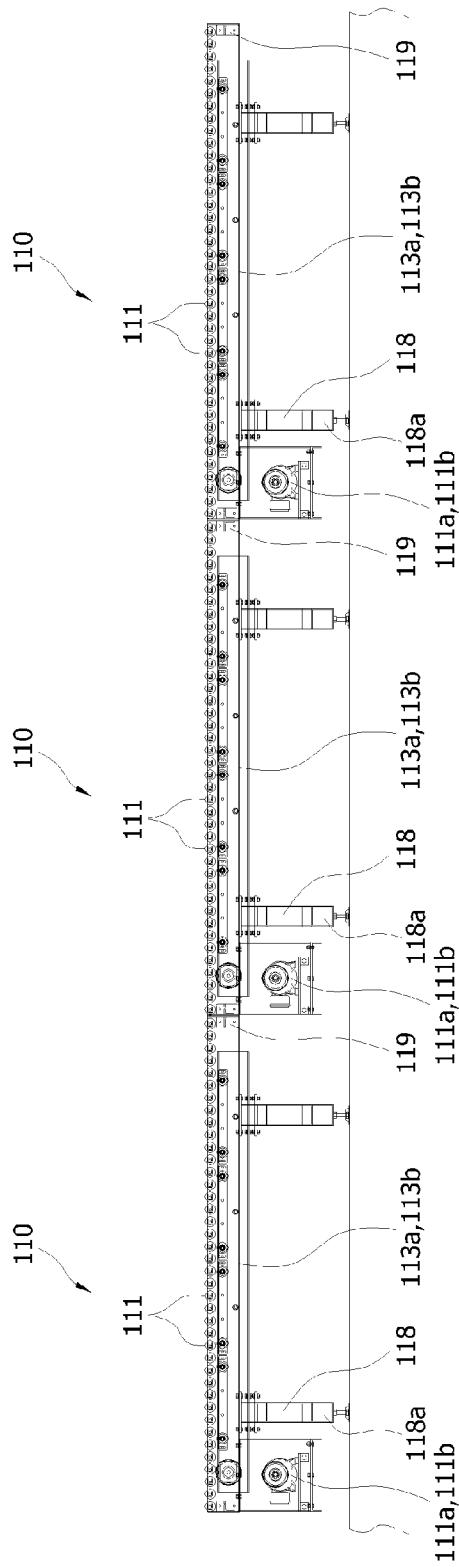
FIG. 3B is a side view showing the supply unit of the automatic article sorting conveyor apparatus according to at least one embodiment of the present invention.
Figure 9:
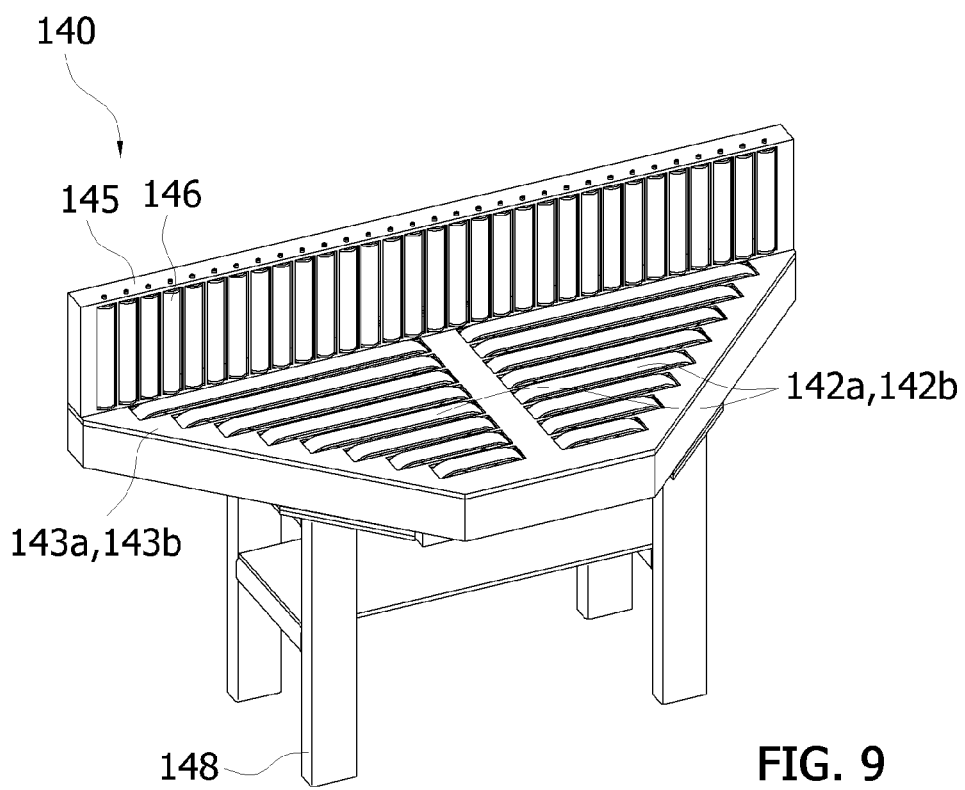
FIG. 9 is a perspective view of the redirection unit of the automatic article sorting conveyor apparatus according to at least one embodiment of the present invention.

As shown in FIGS. 1, 2 and 9, the redirection unit 140 includes first and second redirection frames 143a and 143b. The first and second redirection frames have oblique sides at one end thereof coupled to the respective discharge ends of the first and second conveying belt frames 130a and 130b having the same elevation as or an elevation relatively higher than the middle belt 124, and have oblique sides at the other end thereof coupled to the first and second oblique roller frames 113a and 113b of the supply unit 110. The first and second redirection frames 143a and 143b may include first and second redirection belts 142a and 142b configured to guide and convey articles loaded while they are circulated and rotated by a rotational drive toward the first and second oblique rollers of the supply unit.

The first and second redirection frames 143a and 143b may be formed of a box body in which opening parts are provided on top thereof so that the first and second redirection belts having tops come into contact with articles reversely conveyed by the conveying belt are exposed and oblique sides respectively coupled to the first and second conveying belt frames and the supply unit between a long side and a short side are provided on the left and right sides.

Furthermore, the first and second redirection frames 143a and 143b formed of the box body are horizontally disposed on the top of supports 148. The first and second redirection belts are circulated and rotated by the rotational drive of a driving motor (not shown).

Furthermore, a vertical frame 145 is vertically positioned in the long side part of the first and second redirection frames 143a and 143b at a predetermined elevation to prevent the fall of articles redirected toward the supply unit side by the circular rotation of the first and second redirection belts. A plurality of vertical rollers 146 has the top and bottom assembled with the vertical frame so as to be freely rotatable.

Accordingly, when articles dropped through the drop chutes are reversely conveyed by the conveying belt including the horizontal conveying belt and the inclined conveying belt and supplied to the first and second redirection frames 143a and 143b of the redirection unit, the articles can be redirected by the first and second redirection belts circulated and rotated by the redirection unit, can be resupplied to the first and second oblique rollers of the supply unit 110, and can be realigned and processed.

The present invention described above has the following effects.

1) A large amount of articles randomly supplied to the supply unit all at the same time are loaded onto the front end and left and right sides of the middle belt by the first and second oblique rollers and the third and fourth oblique rollers that are rotatably driven and collected. Accordingly, various sizes and types of articles can be smoothly performed in a sorter and a separator in a post process because the articles can be aligned on top of the middle belt in a row and conveyed to the post process, thereby improving work productivity.

2) Articles not aligned in a row on the middle belt can be dropped toward the first and second drop chutes by the rotational driving of the first and second oblique rollers provided on both sides of the middle belt. The dropped articles can be reversely conveyed and resupplied towards the supply unit. Accordingly, a logistic alignment and separation task can be stably performed regardless of article input throughput because not-aligned and non-processed article can be repeatedly circulated, thereby being capable of improving work productivity.

It will be evident to those skilled in the art to which the present invention pertains that the present invention described above is not restricted by the aforementioned embodiments and the accompanying drawing and may be substituted, modified and changed without departing from the technical spirit of the present invention.

What is claimed is:

1. An automatic article sorting conveyor apparatus, comprising:
    a supply unit configured to comprise first and second oblique roller frames having a plurality of first and second oblique rollers rotatably driven by first and second motors, and to convey articles so that the articles are collected between the first and second oblique roller frames;
    an arranging unit configured to comprise third and fourth oblique roller frames having a plurality of third and fourth oblique rollers rotatably driven by third and fourth motors and a middle belt frame comprising a middle belt having a front coupled to the first and second oblique roller frames, positioned between the third and fourth oblique roller frames and circulated and rotated by a rotational drive, and to arrange and convey articles loaded onto a front end side of the middle belt and articles loaded onto both sides of the middle belt in a row; and
    an article drop unit configured to comprise first and second counter-oblique roller frames having a plurality of first and second counter-oblique rollers rotatably driven by fifth and sixth motors on left and right sides of the middle belt, first and second drop chutes having one ends coupled to the first and second counter-oblique roller frames and disposed on both sides of the middle belt frame, and first and second conveying belt frames having one ends coupled to the first and second drop chutes and including conveying belts circulated and rotated by a rotational drive, and to reversely convey articles that are moved to both sides of the middle belt and dropped to the first and second drop chutes, wherein the dropped articles are resupplied towards the supply unit.

2. The automatic article sorting conveyor apparatus of claim 1, wherein any one of the first to sixth motors rotatably driving the first and second oblique rollers, the third and fourth oblique rollers and the first and second counter-oblique rollers comprises:
    a driving pulley assembled with a driving shaft;
    a driven pulley coupled to the driving pulley through the medium of a belt member;
    a support bracket with which one end of a support shaft assembled with the driven pulley is assembled in such a way as to be replaceable; and
    a driving contact roller integrally assembled with the support shaft through the medium of the driven pulley and a coupling member to circumscribe any one of the plurality of rollers through a medium of a belt member for contact.

3. The automatic article sorting conveyor apparatus of claim 2, wherein the support bracket is installed on a horizontal stand fixed to any one of the first to fourth oblique roller frames, the first and second counter-oblique roller frames and coupled through a medium of a bolt member for elevation adjustment having a nut member for fixing.

4. The automatic article sorting conveyor apparatus of claim 1, wherein first and second inclined plates are inclined at a specific angle and externally disposed between the first and second counter-oblique roller frames and the first and second conveying belt frames.

5. The automatic article sorting conveyor apparatus of claim 1, wherein the first, second conveying belt frame comprises:
    a horizontal belt frame having a horizontal conveying belt having one end coupled to discharge ends of the first and second drop chutes positioned at a location relatively lower than the middle belt and circulated and rotated by a rotational drive of a seventh motor; and
    an inclined belt frame having an inclined conveying belt coupled to one end of the horizontal belt frame and circulated by a rotational drive of an eighth motor to convey dropped articles up to an elevation corresponding to the middle belt.

6. The automatic article sorting conveyor apparatus of claim 1, wherein:
the middle belt is provided in a middle belt frame between the third and fourth oblique roller frames, between the first and second counter-oblique roller frames and between the first and second drop chutes in such a way as to be circulated and rotated,
the middle belt frame comprises a pair of support plates having bottoms fixed to the third and fourth oblique roller frames, the first and second counter-oblique roller frames, and the first and second drop chutes, and
both ends of a plurality of rollers for belt circulation on which the middle belt is wound are rotatably supported to the pair of support plates.

7. The automatic article sorting conveyor apparatus of claim 1, further comprising a redirection unit configured to redirect the articles dropped and reversely conveyed by the article drop unit toward the supply unit side,
wherein the redirection unit comprises first and second redirection frames having oblique sides at one end coupled to the first and second conveying belt frames and oblique sides at the other end coupled to the first and second oblique roller frames of the supply unit and circulated and rotated by a rotational drive.

8. The automatic article sorting conveyor apparatus of claim 7, wherein the redirection unit comprises:
a vertical frame vertically positioned in a long side part of the first and second redirection frames at a predetermined elevation to prevent falling of articles redirected toward the supply unit side by the circular rotation of the first and second redirection belts; and
a plurality of vertical rollers having a top and bottom assembled with the vertical frame so as to be freely rotatable.

* * * * *